(No Model.)

J. WHEELER.
CUTTING TOOL FOR CUTTING SCREWS.

No. 427,386. Patented May 6, 1890.

Witnesses:
Robt. Everitt
J. A. Rutherford

Inventor:
John Wheeler
By Edward Taggart, Atty.

UNITED STATES PATENT OFFICE.

JOHN WHEELER, OF WALKER, ASSIGNOR TO THE GRAND RAPIDS HAND SCREW COMPANY, OF GRAND RAPIDS, MICHIGAN.

CUTTING-TOOL FOR CUTTING SCREWS.

SPECIFICATION forming part of Letters Patent No. 427,386, dated May 6, 1890.

Application filed July 18, 1889. Serial No. 317,902. (No model.)

*To all whom it may concern:*

Be it known that I, JOHN WHEELER, a citizen of the United States, residing in the township of Walker, in the county of Kent and State of Michigan, have invented a certain new and useful Cutting-Tool for Cutting Screws, of which the following is a specification.

The invention relates to a new and useful tool for cutting V-shaped grooves for screws and other similar purposes, the object of the invention being to cut the wood without breaking or straining the grain of the wood which forms the thread of the screw; also to increase the rapidity with which wooden screws may be manufactured by means of a revolving tool or cutter. These objects I accomplish by means of the mechanism illustrated in the accompanying drawings, in which—

Figure 1:
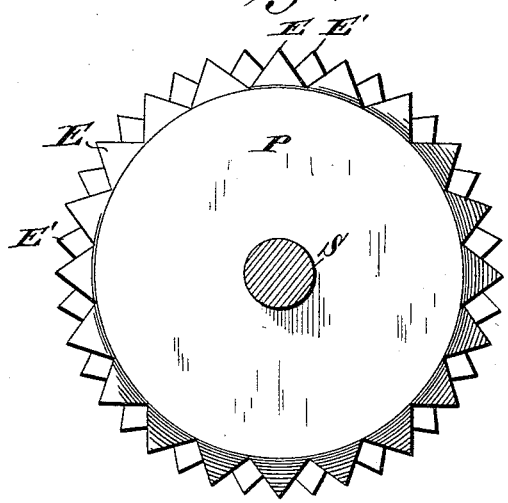
Figure 2:
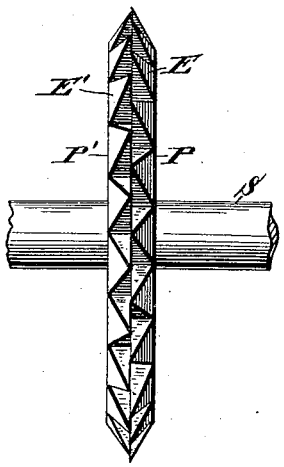
Figure 3:
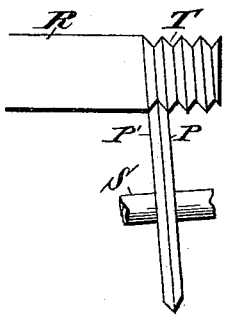

Figure 1 shows a side elevation of my newly-invented cutting-tool. Fig. 2 shows an edge view of the same, and Fig. 3 shows the position in which it may be used for cutting the threads for a wooden screw.

Similar letters refer to similar parts throughout the several views.

The cutter is constructed in two plates, each plate having saw-teeth or cutter-teeth fixed so as to form one-half of a V-shaped groove. These plates are shown by P and P'. In the plate P all the teeth are placed so as to form one side of the incline, and in the plate P' the teeth are all filed or fashioned so as to form the other side of the incline or V shape. These two plates are placed together, so that the point of each tooth on one plate will be at a point midway between the points of two teeth on the other plate. By this construction the teeth will act upon the wood separately, so as to prevent the splitting or straining of the grain of the wood, and inasmuch as the teeth are revolved with great velocity the finished screw will be perfect in every respect.

In Fig. 1, P represents the plate which is in view, and is provided with the teeth E E E, &c., each one of which teeth has a bevel or incline, as shown. E' E', &c., represent the teeth on the lower plate, or plate which is shown in Fig. 2 by P'. The bevel on the teeth E' E' cannot be seen in Fig. 1, for the reason that they are on the opposite side of the teeth shown therein.

In Fig. 2, which is an edge view of the cutting-tool, the bevels of the teeth E and E' are shown meeting, so as to form a V-shaped cut.

In Fig. 3, R shows a blank of wood. P P' shows the cutting-tool mounted upon an arbor or shaft S. T shows the screw-thread.

The object of Fig. 3 is to show one manner of applying my newly-invented cutting-tool to cutting screw-threads. The plates P and P' are preferably made of ordinary saw-plate, which may be varied in thickness to suit the objects for which the cutting-tool is to be used; and the invention consists in fashioning the teeth into the form described, and then attaching together the two plates upon one arbor in such a manner that the points of each tooth on one plate will be at or near the center between the points of two teeth upon the other plate, so that in operation each tooth may operate separately, for the purpose above described.

In operation the wooden blank may be fed by any suitable means and the cutting-tool revolved in the ordinary manner, the cutting-tool being placed at such an angle to the stock as to cut a screw of the required lead.

I am aware that V-shaped cutting-tools have been in use prior to my invention; but I am not aware that any cutting-tool for the purpose of cutting grooves or screw-threads having two plates attached together with the teeth filed so as to cut the required thread has ever been used.

Having thus described my invention, what I claim to have invented, and desire to secure by Letters Patent, is—

A tool for cutting V-shaped grooves, consisting of two superposed plates having a series of teeth on their peripheries, each of which is formed on its outside with a bevel extending from the outer surface of the plate to the inner surface thereof, said plates being arranged with the point of every tooth on one plate midway between the points of two teeth on the contiguous plate, and the teeth of one plate coacting with the teeth of the other plate to cut a V-shaped groove, substantially as described.

In witness whereof I have hereunto set my hand and seal in the presence of two witnesses.

JOHN WHEELER. [L. S.]

Witnesses:
ARTHUR C. DENISON,
HENRY P. VAN WAGNER.